Patented Feb. 26, 1935

1,992,180

UNITED STATES PATENT OFFICE 1,992,180

COMPOSITION OF MATTER AND METHOD OF PRODUCING THE SAME

Albert Henry Bowen and Theodore Williams Dike, Seattle, Wash., assignors to I. F. Laucks, Incorporated, Seattle, Wash., a corporation of Washington No Drawing. Application April 19, 1933, Serial No. 666,930

10 Claims. (Cl. 260—3)

Our invention relates to new condensation products obtained by reacting together zinc chloride, urea and formaldehyde and to processes for their manufacture and use. We have discovered that these materials may be chemically combined to form useful, stable solid and liquid intermediate condensation products and that these intermediates are readily converted to final products serving a variety of uses with marked economy and commercial advantage.

To the accomplishment of the foregoing and related ends, the invention, then comprises the features hereinafter fully described, and particularly pointed out in the claims, the following description setting forth in detail certain illustrative embodiments of the invention, these being indicative however, of but few of the various ways in which the principle of the invention may be employed.

Preferably we operate with a molecular ratio of up to 0.25 molecules of zinc chloride to 1 molecule of urea, with the formaldehyde ratio 1.70 and 2.25 molecules, preferably about 2.0 molecules. If the amount of zinc chloride is much less than 2% of the weight of the urea, the effect of the former is very slight. By weight these ratios correspond to 57 parts of zinc chloride, and between 230 and 300, preferably about 275, parts of commercial 37% formalin, to each 100 parts of urea (corresponding to 85 to 111 parts formaldehyde, preferably 102).

For most purposes commercial formalin and zinc chloride are satisfactory as well as agricultural urea and only in special cases is it necessary to use purified materials.

The reaction is desirably carried out in aqueous solution, such for instance as when commercial formalin is used to provide the formaldehyde. The other materials are dissolved in the formalin, it being preferable to dissolve the zinc chloride before adding the urea to prevent reaction commencing too soon. The temperature maintained during reaction is important, useful intermediates being obtained by reacting below 212 degrees F., usually considerably below and in some cases close to or at room temperature. Boiling the mixture forms an irreversible gel.

The reaction proceeds by stages. First apparently there is a condensation with the formation of colloidal sols, followed by successive stages involving polymerization indicated by increasing viscosity and decreasing solubility with ultimate development of an irreversible gel, which further polymerization converts to an infusible, insoluble end product. Using purified materials a final product is readily obtained which is transparent, colorless, brilliant and glass-like. Either heat or strongly acid conditions in the presence of moisture promote polymerization toward the final end product. The properties may be influenced by a variety of plasticizers and modifying agents.

Desirable intermediates for use as such or for convenient conversion by a subsequent treatment, are obtained by interrupting or controlling the reaction in such a way that polymerization is stopped at least somewhat before the formation of the irreversible gel takes place. When the proper conditions are observed it is possible to obtain liquid intermediate compounds of exceptional stability. Under still other conditions the intermediate products may be dried to produce stable but potentially reactive materials in solid form, either as films, solid masses or powders.

Our products are distinguished from reaction products of urea and formaldehyde both by containing up to 20% of combined zinc chloride, by the unique properties of the products themselves, by the lower cost of manufacture, and especially by the ease with which solid and liquid intermediates are produced and the unusual stability of the latter.

If more than 57 parts of zinc chloride are used the properties of zinc chloride, particularly its hygroscopic character, are apparent in the dried intermediate products, but if the proportion is reduced to 57 parts or below, the hygroscopic character disappears and all the zinc chloride appears to be combined. With 57 parts of zinc chloride we have approximately a 20% content of this salt in the dry product, in which case its hygroscopic character would certainly be manifest if it existed as such. If the zinc chloride split up, a strongly acid condition would result inducing rapid polymerization with the conversion of the fluid to a gel. This does not occur, but on the contrary the zinc chloride has a strong stabilizing effect instead of an accelerating action.

Neither metallic zinc nor its other compounds have this effect, neither do other chlorides nor in fact any other compounds that we have been able to discover. There does not appear to be any substitute or equivalent for zinc chloride in these reactions and products.

Owing to the combined state of the zinc chloride it is evident that our compounds cannot be any form of dimethylolurea. This is clear in view of the fact that unpolymerized or slightly polymerized dimethylolurea is strongly hygroscopic, while our intermediate products are not.

The following example illustrates a method of practising our invention under commercial conditions. Proportions are given by weight.

50 lbs. of commercial zinc chloride are dissolved in 275 lbs. of 37% commercial formalin. This operation is conveniently performed in a closed-top cylindrical container equipped with a power stirring device. Solution is completed in about five minutes. Considerable heat is developed. As soon as the zinc chloride is dissolved and without waiting for the heat of solution to be dissipated, 100 lbs. of agricultural urea are stirred in and the stirring continued for about two minutes until the urea is dissolved and the liquid has begun to heat up. By this method the energy released during the solution of the zinc chloride supplies a good part of the heat required for the solution of the urea and the time required to carry out the whole process is shortened. The liquid is at this point allowed to pass out of the container into a series of pipe coils surrounded by a succession of water baths providing three zones for temperature control of the contents of the pipes. In order to empty the container rapidly it is preferable to provide several duplicate sets of coils and to operate them in parallel. This increases the output and avoids any lack of uniformity due to variation in the amount of reaction which takes place during the interval required to empty the container. The first bath is short and kept at a temperature above 170 degrees F., adjusted so as to quickly bring the temperature of the solution within the pipe to that temperature. The pipe coils are then led into a second bath at 170 degrees, the length of coil being such as to hold the material at that temperature for 30 minutes while it is constantly progressing forward. The coils are then led through a cooling bath adjusted to bring the material quickly down to room temperature, whereupon it is discharged into containers for storage.

By this method a large output of uniform product is cheaply obtained under conditions permitting close technical control. The process can be made completely continuous by providing duplicate mixing chambers so that a supply of solution is always ready to enter the reaction coils.

The product of this reaction is a stable syrupy, nearly clear liquid which can be stored for many months without change. The stability is remarkable as compared to other liquid condensation syrups obtained from reactions between urea and formaldehyde, which more or less rapidly thicken and change to a useless irreversible gel.

Reducing the temperature or shortening the time of treatment provides a less advanced type of product of lower viscosity requiring more subsequent polymerization to convert it to the end product. Conversely, any increase in the time or intensity of heat treatment has the reverse effect. If the reaction is carried out at 190 degrees the treatment must be very short, while at 160 degrees the treatment must be greatly lengthened. In all cases deficiency of heat treatment produces an unstable, thin, cloudy liquor, which eventually forms a precipitate, while too much heat produces a clear, thick, viscous liquor which eventually solidifies as an irreversible gel.

Reducing the zinc chloride content has the effect of increasing the time and intensity of heating required to produce these liquors. If the 50% ratio of zinc chloride to urea is reduced to 25% the time required to complete the reaction at a given temperature is more than doubled. At a 6% ratio only cloudy liquors are obtained and their stability is greatly reduced. Below that ratio stable liquids cannot be obtained.

These stable liquors may be used in a variety of ways. Particularly important uses are as adhesives and for coating and sizing. When exposed to the air in thin films they dry rapidly with or without artificial heat. They may be converted into dry powder adhesives by any convenient method of drying which avoids an excess heat treatment such as would convert them too much. Both drum and spray drying methods may be used. The resulting powder is a dry glue which when spread uniformly upon porous surfaces and plasticized by a small amount of water, melts under the influence of heat and pressure and is rapidly converted to form a strong and highly water resistant bond. With a less complete conversion water resistance falls off but the dry strength is still great and the time in the press is reduced. Excellent results are obtained in as short a time as 30 seconds in the press, if the face plies are thin. This liquor dried on paper forms a useful adhesive as it is readily softened by moistening and sets quickly without heat, with the further advantage that if heat is used to set it or even if the bond is heated subsequently to setting, the union of the parts becomes highly water resistant. Sheet material, such as wood veneer, insulating board, asbestos board, cloth, tissue paper, wire cloth, etc., may be coated or saturated with the material, then dried and then laminated to other untreated sheet material in a hot press, the hydroscopic water normally present in such material sufficing to induce satisfactory plasticity in the hot press. Products thus formed are provided with a strong and water resistant bond. A variety of laminated products may thus be produced.

This material has a high specific adhesion for nearly all substances, such as metals, glass, rubber, etc., and is valuable for uniting different types of surfaces which offer difficulties with ordinary adhesives. By this means leather or felt can be glued to rubber. Other applications include use as a lacquer or varnish, as a stiffener for textiles and composition sheets, as a waterproofing agent, as a base for films and film glues, as a binder for molded products, as a base for cements, as a coating material, as a joint and dowel glue, etc. Combined with suitable materials it is a useful base for polishes. It also has excellent cleaning properties for metals making a useful base for brass and metal polishes. The pulverized product in powder form with or without inert fillers is a molding powder suitable for molding plastics. The material in powder form can be mixed with acid-providing materials, also in powder form. Upon the addition of water polymerization commences and the material used either as a glue or cement sets in the cold to provide a water resistant bond. The same effect is also obtained with the liquid condensation product. In either case the life of the adhesive and time to produce the bond can be controlled by regulating the degree of acidity. The acid setting can also be brought about by associating the adhesive with the acid in situ; for instance in dowel gluing the dowel can first be dipped in an acid solution and then the glue applied to the treated surface and the parts assembled.

If the materials in the proportions previously given are mixed and simply allowed to stand in the container without the application of external heat, a white precipitate appears and after some time the mass is converted to a white semi-solid mush which can be stored indefinitely. This mush can be subsequently melted by heating to between 140 degrees F. and 190 degrees F. and is thus converted into the same variety of liquid intermediate product as if it had been heated directly as in the example given previously. This mush can also be dried without heating producing a white solid, which when powdered is a dry glue similar to that produced from the liquid but in a less reacted and more water soluble state, with increased properties of flow when used under heat and pressure.

When the zinc chloride element is reduced to 2% of the weight of the urea, a mush is also produced which can be dried and powdered, producing a useful dry glue.

The action of the zinc chloride when combined with urea and formaldehyde, appears to be analogous to the action of sulphur when combined with rubber in that combination can occur in any proportion within a wide range and that the properties of the product vary directly with the amount of the substance in combination. This affords an explanation of the wide variety of uses for which our products are desirable because an unusual opportunity is afforded to adjust the properties of the product to the use in view.

Besides the modifications due to adjustment of the zinc chloride ratio and to controlling the extent of the reaction, other modifications are sometimes desirable. By replacing about 10% of the urea with phenol clear liquors are obtained over a wider range of heat treatment and for certain uses the water resistance of the fully converted product is increased. Sucrose enhances the toughness of thin films of the converted end product. Both of these elements appear to combine chemically in the product.

Other modes of applying the principle of the invention may be employed instead of these herein explained, change being made as regards the details disclosed, provided the features stated in any of the following claims, or the equivalent of such, be employed.

We claim:—

1. A process of forming condensation products which comprises reacting zinc chloride, urea and formaldehyde in aqueous solution, the zinc chloride being present in amount 6 to 57 parts to each 100 parts of urea.

2. A process of forming condensation products which comprises reacting zinc chloride, urea and formaldehyde in aqueous solution, the formaldehyde being present in amount between 85 and 111 parts to each 100 parts of urea, and the zinc chloride being present in amount between 6 to 57 parts to each 100 parts of urea.

3. A process of forming condensation products which comprises reacting zinc chloride, urea and formaldehyde in aqueous solution, the temperature being maintained below the boiling point of the mixture, and the zinc chloride being present in amount between 6 to 57 parts to each 100 parts of urea.

4. A process of forming condensation products which comprises reacting zinc chloride, urea and formaldehyde in aqueous solution, by mixing the several ingredients at approximately room temperature and thereby causing the reaction, the zinc chloride being present in amount between 6 and 57 parts to each 100 parts of urea.

5. A process of forming condensation products which comprises reacting zinc chloride, urea and formaldehyde in aqueous solution, by mixing the several ingredients at approximately room temperature and thereby causing the reaction, the zinc chloride being present in amount between 6 to 57 parts to each 100 parts of urea to form a mush and drying the mush thus formed.

6. A process of forming condensation products which comprises reacting zinc chloride, urea, formaldehyde and phenol in aqueous solution, the zinc chloride being present in amount of 6 to 57 parts to each 100 parts of urea.

7. As a new article of manufacture, a product comprising the reaction products of 6 to 57 parts of zinc chloride, to each 100 parts of urea, and formaldehyde.

8. As a new article of manufacture, a viscous, aqueous liquid comprising the reaction products of zinc chloride, urea and formaldehyde, the zinc chloride being present in amount below 57 parts to each 100 parts urea, and the formaldehyde being present in amount between 85 to 111 parts of formaldehyde to each 100 parts urea, the zinc chloride being present in amount of 6 to 57 parts to each 100 parts of urea.

9. As a new article of manufacture, a product comprising the reaction products of zinc chloride, urea and formaldehyde, the zinc chloride being present in amount of 6 to 57 parts to each 100 parts urea, and the formaldehyde being present in amount between 85 to 111 parts of formaldehyde to each 100 parts urea.

10. A process which comprises consolidating the reaction products of zinc chloride, urea and formaldehyde by means of heat and pressure, the zinc chloride being present in amount of 6 to 57 parts to each 100 parts of urea.

ALBERT HENRY BOWEN.
THEODORE WILLIAMS DIKE.